(12) United States Patent
Chen et al.

(10) Patent No.: US 7,579,726 B2
(45) Date of Patent: Aug. 25, 2009

(54) FAN, MOTOR AND STATOR STRUCTURE THEREOF

(75) Inventors: Lee-Long Chen, Taoyuan Hsien (TW);
Shih-Wei Huang, Taoyuan Hsien (TW);
Shih-Ming Huang, Taoyuan Hsien (TW); Wen-Shi Huang, Taoyuan Hsien (TW)

(73) Assignee: Delta Electronics, Inc., Toayuan Hsien (TW)

( * ) Notice: Subject to any disclaimer, the term of this patent is extended or adjusted under 35 U.S.C. 154(b) by 503 days.

(21) Appl. No.: 11/363,408

(22) Filed: Feb. 28, 2006

(65) Prior Publication Data
US 2006/0255681 A1    Nov. 16, 2006

(30) Foreign Application Priority Data
May 13, 2005  (TW) ............................... 94115565 A (51) Int. Cl.
*H02K 5/22*  (2006.01)
(52) U.S. Cl. ................... 310/67 R; 417/354; 417/423.7
(58) Field of Classification Search ............... 310/67 R, 310/216, 254, 49 R; 417/354, 423.7
See application file for complete search history.

(56) References Cited

U.S. PATENT DOCUMENTS 6,936,940 B2 *  8/2005  Kobayashi et al. ......... 310/67 R
6,940,238 B2 *  9/2005  Gerfast ................... 318/400.29

* cited by examiner

*Primary Examiner*—Gary F. Paumen
(74) *Attorney, Agent, or Firm*—Birch, Stewart, Kolasch & Birch, LLP (57) ABSTRACT

A stator structure of a motor includes a first magnetic substrate, a second magnetic substrate and a plurality of coil units. An outer profile of the first magnetic substrate has a plurality of first protruding parts, and an outer profile of the second magnetic substrate has a plurality of second protruding parts. The first magnetic substrate and the second magnetic substrate are correspondingly disposed. The coil units disposed between the first magnetic substrate and the second magnetic substrate respectively have a coil wound around a central axis of the coil unit, and at least one magnetically conductive element disposed within the coil.

20 Claims, 7 Drawing Sheets

FAN, MOTOR AND STATOR STRUCTURE THEREOF

BACKGROUND OF THE INVENTION

1. Field of Invention

The present invention relates to a fan, a motor and a stator structure thereof, and more particularly to a fan with axial-winding and radial-induction, and its motor and stator structure.

2. Related Art

Accompanying to the development of technology, the electronic apparatus has become an indispensable product at home or office in the daily life. The motor is widely used in the electronic apparatus, which can effectively convert the electric energy into the mechanical energy.

The motors may be classified into many types. A conventional brushless motor structure includes a rotor structure and a stator structure. The rotor structure is fitted into a bearing of the stator structure. The stator structure interacts with a permanent magnet of the rotor structure to generate an alternating and rotating magnetic field to enforce the rotor structure to rotate.

Figure 1:
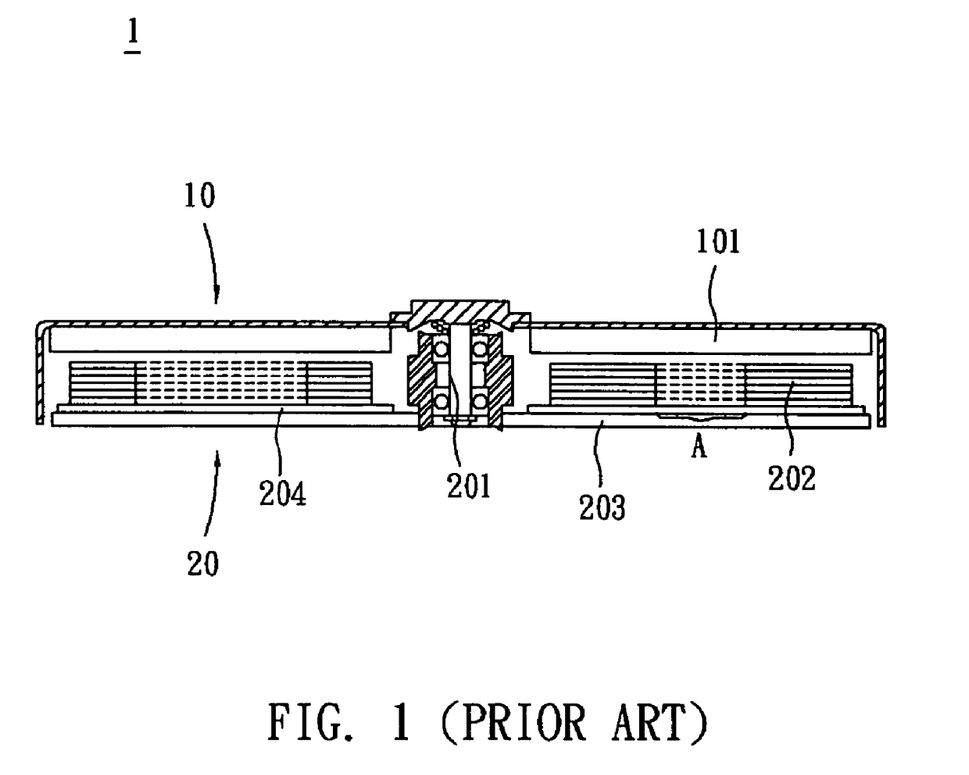
FIG. 1 is a schematic view showing a conventional axial-winding and axial-induction motor.
Figure 2:
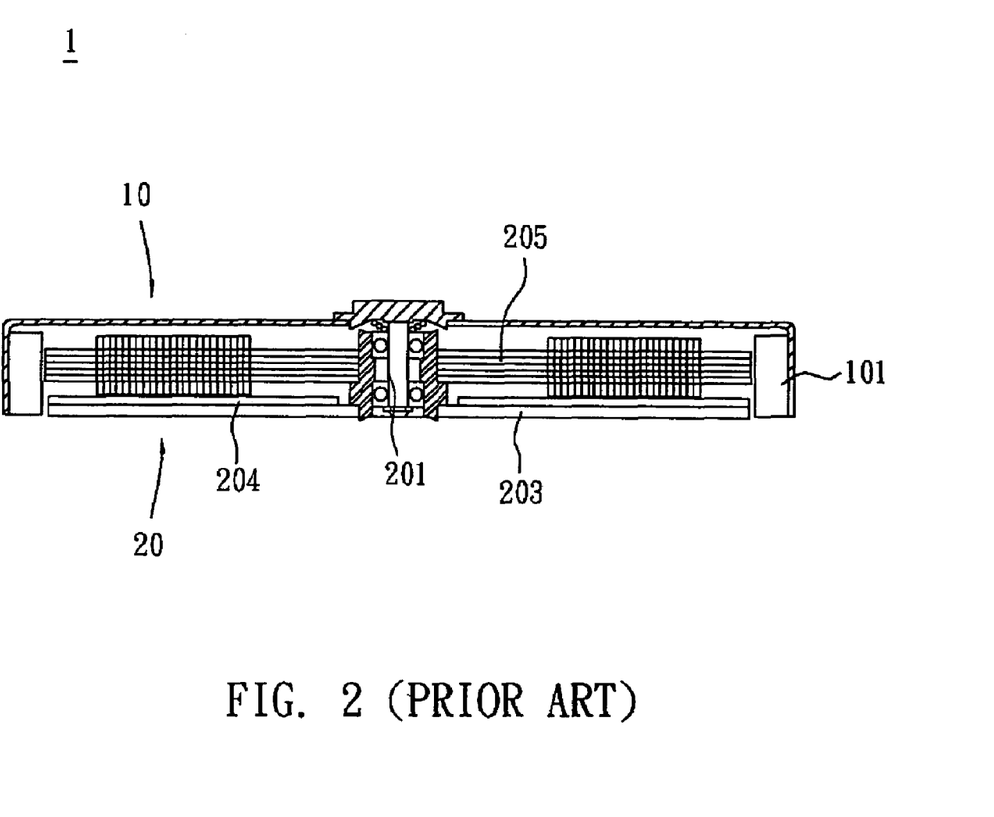
FIG. 2 is a schematic view showing a conventional radial-winding and radial-induction motor.

The brushless motors may be classified into an axial-winding and axial-induction motor and a radial-winding and radial-induction motor according to the coil winding method and the induction manner. As shown in FIG. 1, the axial-winding and axial-induction brushless motor 1 has a stator structure 20 which includes a coil set 202 made of windings with predetermined number of turns, a magnetic base 203 and a circuit board 204. The stator structure 20 interacts with a permanent magnets 101 attached to an upper inner surface of a rotor structure 10 to produce the axial-induction. As shown in FIG. 2, coils of a radial-winding and radial-induction brushless motor 1 are wound around pole arms 205 of a stator structure 20, and interact with the magnetic field formed by a permanent magnet 101 attached to the circumferential inner wall of a rotor structure 10.

However, for the axial-winding brushless motor 1 as shown in FIG. 1, because of the restricted space of the motor, the number of winding turns of the coil set 202 and the magnetic area A cannot be simultaneously increased. That is, in the restricted space, the greater number of winding turns is, the less magnetic area A becomes in the coil set 202, which will influence the effect of the magnetic force. In addition, the permanent magnet 101 of the rotor structure 10 and the magnetic base 203 of the stator structure 20 induce an attractive force with each other due to the axial-induction. Thus, the force applied to the bearing 201 of the motor is too large, and the structure of the magnetic base 203 may deform. For the radial-winding brushless motor 1 as shown in FIG. 2, because the coils have to be wound around the pole arms 205 and the spaces between the pole arms 205 are restricted, the winding of the coils is inconvenient and the speed of winding the coils is limited. Furthermore, the distribution of the magnetic field generated by the coils is not uniform, and the weight of the suspended pole arms 205 plus coils causes the large loading to the central support of the motor.

It is thus imperative to provide a fan, a motor and a stator structure thereof capable of solving the above-mentioned problems.

SUMMARY OF THE INVENTION

In view of the foregoing, the present invention provides a firm fan with a good magnetic effect, of which a motor and a stator thereof are manufactured easily.

To achieve the above, a stator structure according to the present invention includes a first magnetic substrate, a second magnetic substrate and a plurality of coil units. An outer profile of the first magnetic substrate has a plurality of first protruding parts, and an outer profile of the second magnetic substrate has a plurality of second protruding parts. The second magnetic substrate is correspondingly disposed with respect to the first magnetic substrate. The coil units are disposed between the first magnetic substrate and the second magnetic substrate. The coil units respectively have a coil wound around a central axis of the coil unit, and at least one magnetically conductive element disposed within the coil.

To achieve the above, a motor according to the present invention includes a stator structure, a rotor structure and a driving circuit. The stator structure includes a first magnetic substrate, a second magnetic substrate and a plurality of coil units. An outer profile of the first magnetic substrate has a plurality of first protruding parts, and an outer profile of the second magnetic substrate has a plurality of second protruding parts. The first magnetic substrate and the second magnetic substrate are oppositely disposed and respectively have a central axial hole. The coil units are disposed between the first magnetic substrate and the second magnetic substrate. The coil units respectively have a coil wound around a central axis of the coil unit, and at least one magnetically conductive element disposed within the coil. The rotor structure includes a shaft, a hub and a magnet. The shaft penetrates through the central axial holes of the first and the second magnetic substrates. The magnet is annularly disposed in the hub and has a plurality of first magnetic pole areas and second magnetic pole areas. The first protruding parts and the second protruding parts are corresponding to the first magnetic pole areas and the second magnetic pole areas. The driving circuit is coupled to the coils of the coil units for controlling current directions of the coils.

To achieve the above, a fan according to the present invention includes a stator structure, a rotor structure and a driving circuit. The stator structure includes a first magnetic substrate, a second magnetic substrate and a plurality of coil units. The first magnetic substrate and the second magnetic substrate are oppositely disposed and respectively have a central axial hole. The coil units are disposed between the first magnetic substrate and the second magnetic substrate. The coil units respectively have a coil wound around a central axis of the coil unit, and at least one magnetically conductive element disposed within the coil. The rotor structure includes a shaft, a hub, a magnet and a plurality of blades. The shaft penetrates through the central axial holes of the first and the second magnetic substrates. The magnet is annularly disposed in the hub. The blades are disposed on a circumference of an outer wall of the hub. The driving circuit is coupled to the coils of the coil units for controlling current directions of the coils.

Specifically, the stator structure has a plurality of axial-winding coil units disposed between the first magnetic substrate and the second magnetic substrate to overcome the conventional radial-winding problems of difficult winding process and non-uniform magnetic field distribution. Comparing with the prior art, a fan, a motor and a stator structure thereof according to the present invention can simplify the manufacturing processes and enhance the magnetic effect, and the loading supported by the center of the motor is reduced. Further, the first protruding parts of the first magnetic substrate and the second protruding parts of the second magnetic substrate are alternately disposed. When the driving circuit drives current to flow through the coils of the coil units, the first magnetic substrate and the second magnetic substrate will have different magnetic poles. Then the first protruding parts and the second protruding parts with different magnetic poles can interact with the first magnetic pole areas and the second magnetic pole areas of the magnet of the rotor structure in radial-induction manner to drive the rotor structure to rotate. The radial-induction manner also avoids the conventional axial-winding problem of deformation of the magnetic base.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3:
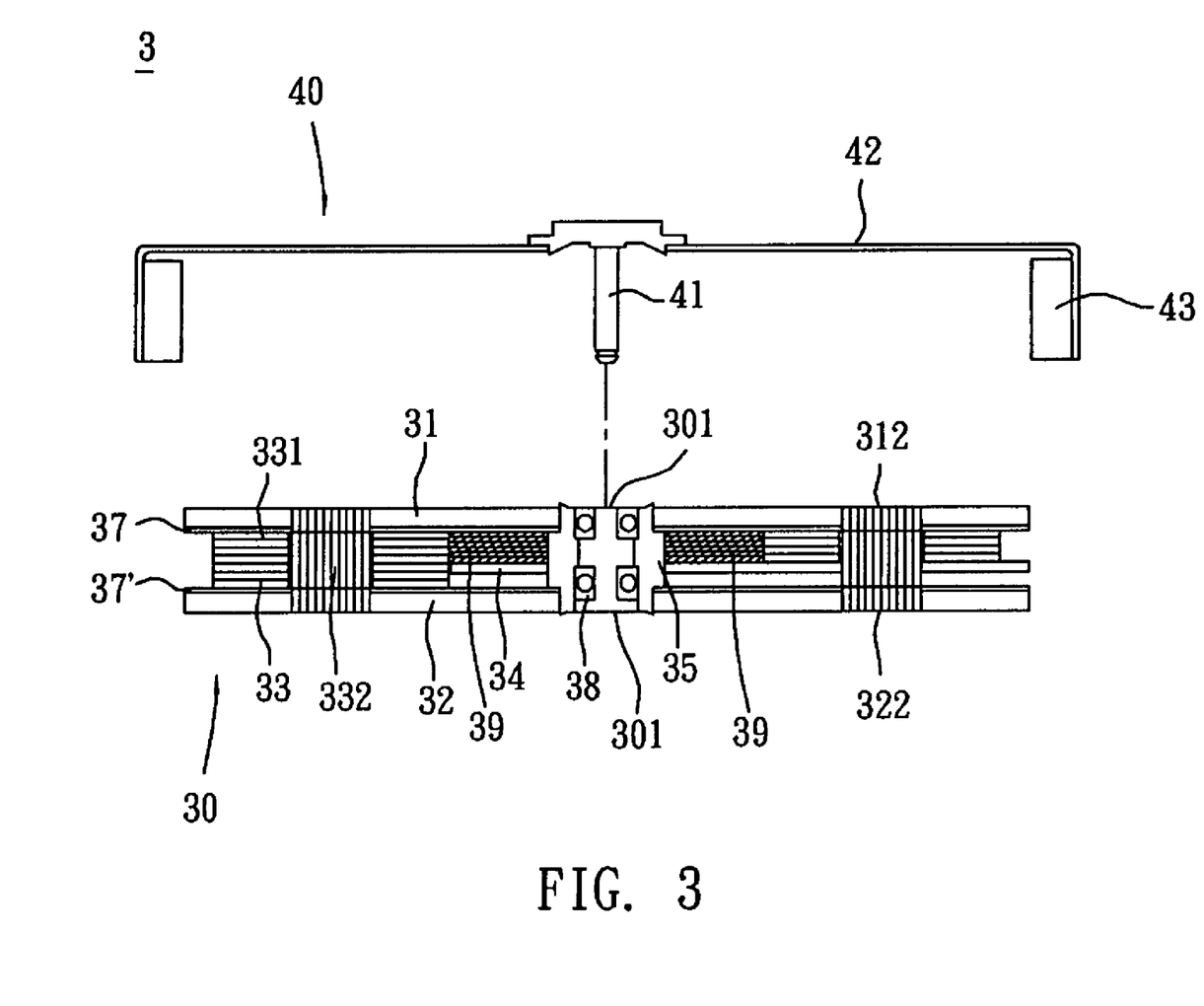
FIG. 3 is a cross-sectional view showing a stator structure and a rotor structure according to an embodiment of the present invention.
Figure 4:
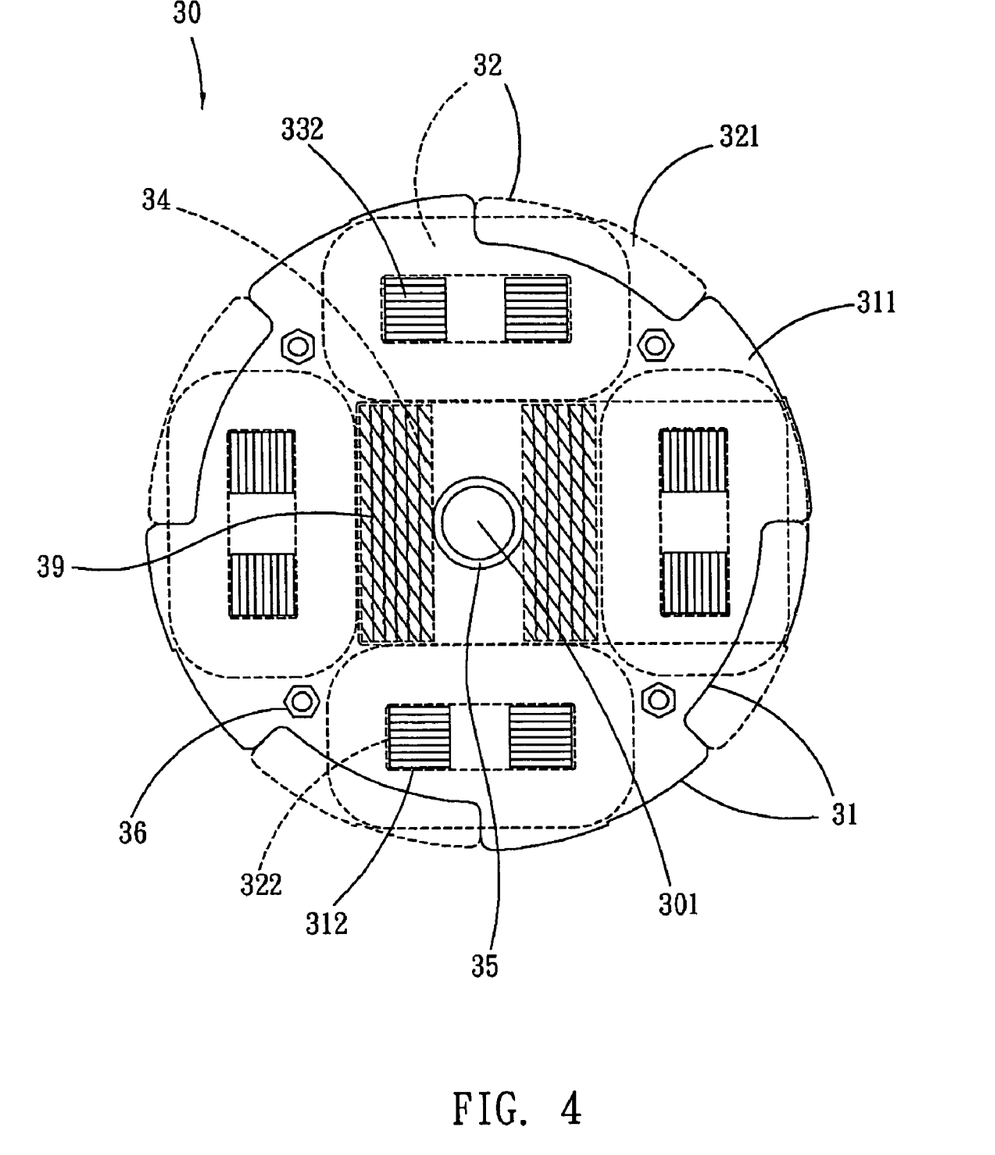
FIG. 4 is a top view showing a stator structure according to an embodiment of the present invention.

Referring to FIGS. 3 and 4, a stator structure 30 of a motor according to an embodiment of the present invention includes a first magnetic substrate 31, a second magnetic substrate 32 and a plurality of coil units 33.

As shown in FIG. 3, the first magnetic substrate 31 and the second magnetic substrate 32 are disposed in opposition and respectively have a central axial hole 301. In this embodiment, the stator structure 30 further includes a bearing sleeve 35 fitted into the central axial holes 301 of the first magnetic substrate 31 and the second magnetic substrate 32, and the first magnetic substrate 31 and the second magnetic substrate 32 are respectively fixed on two ends of the bearing sleeve 35. In addition, the stator structure 30 may further include at least one bearing 38 accommodated in the bearing sleeve 35. The first magnetic substrate 31 and the second magnetic substrate 32 include a plurality of magnetic sheets. In this embodiment, the first magnetic substrate 31 and the second magnetic substrate 32 may be formed of silicon steel sheets, and the bearing sleeve 35 may be made of copper.

The coil units 33 are disposed between the first magnetic substrate 31 and the second magnetic substrate 32. The coil units 33 respectively have a coil 331 and at least one magnetically conductive element 332. The coil 331 is wound around a central axis of the coil unit 33, and the magnetically conductive element 332 is disposed within the coil 331. The magnetically conductive element 332 may also be composed of silicon steel sheets.

The stator structure 30 may further include at least one heat dissipating element 39 disposed between the first magnetic substrate 31 and the second magnetic substrate 32 for dissipating heat generated by the heat source.

As shown in FIG. 3, the stator structure 30 may further include a first insulating layer 37 and a second insulating layer 37'. The first insulating layer 37 is disposed between the first magnetic substrate 31 and the coil units 33. The second insulating layer 37' is disposed between the second magnetic substrate 32 and the coil units 33.

As shown in FIG. 4, an outer profile of the first magnetic substrate 31 has a plurality of first protruding parts 311, and an outer profile of the second magnetic substrate 32 has a plurality of second protruding parts 321. The first protruding parts 311 and the second protruding parts 321 are alternately arranged.

The first magnetic substrate 31 has a plurality of first through holes 312 and the second magnetic substrate 32 has a plurality of second through holes 322. One end of the magnetically conductive element 332 penetrates through the first through holes 312, and the other end of the magnetically conductive element 332 penetrates through the second through holes 322. The magnetically conductive element 332 may be an H-shaped structure or may be composed of two U-shaped structures.

The stator structure 30 according to the embodiment of the present invention further includes a driving circuit 34 coupled to the coils 331 of the coil units 33 for adjusting current directions of the coils 331 and thus controlling polarity changes of the first magnetic substrate 31 and the second magnetic substrate 32. In this embodiment, the driving circuit 34 may be disposed around the central axial hole 301 of the first magnetic substrate 31 or the second magnetic substrate 32.

As shown in FIG. 4, the stator structure 30 further includes a plurality of connecting elements 36 embedded in the first magnetic substrate 31 and extended to contact the second magnetic substrate 32. The second magnetic substrate 32 is formed with a through hole corresponding to the connecting element 36, and an inner wall of the connecting element 36 may have a thread thereon, such that the user can connect an apparatus to the stator structure 30 through a fixing element such as a screw.

Figure 5:
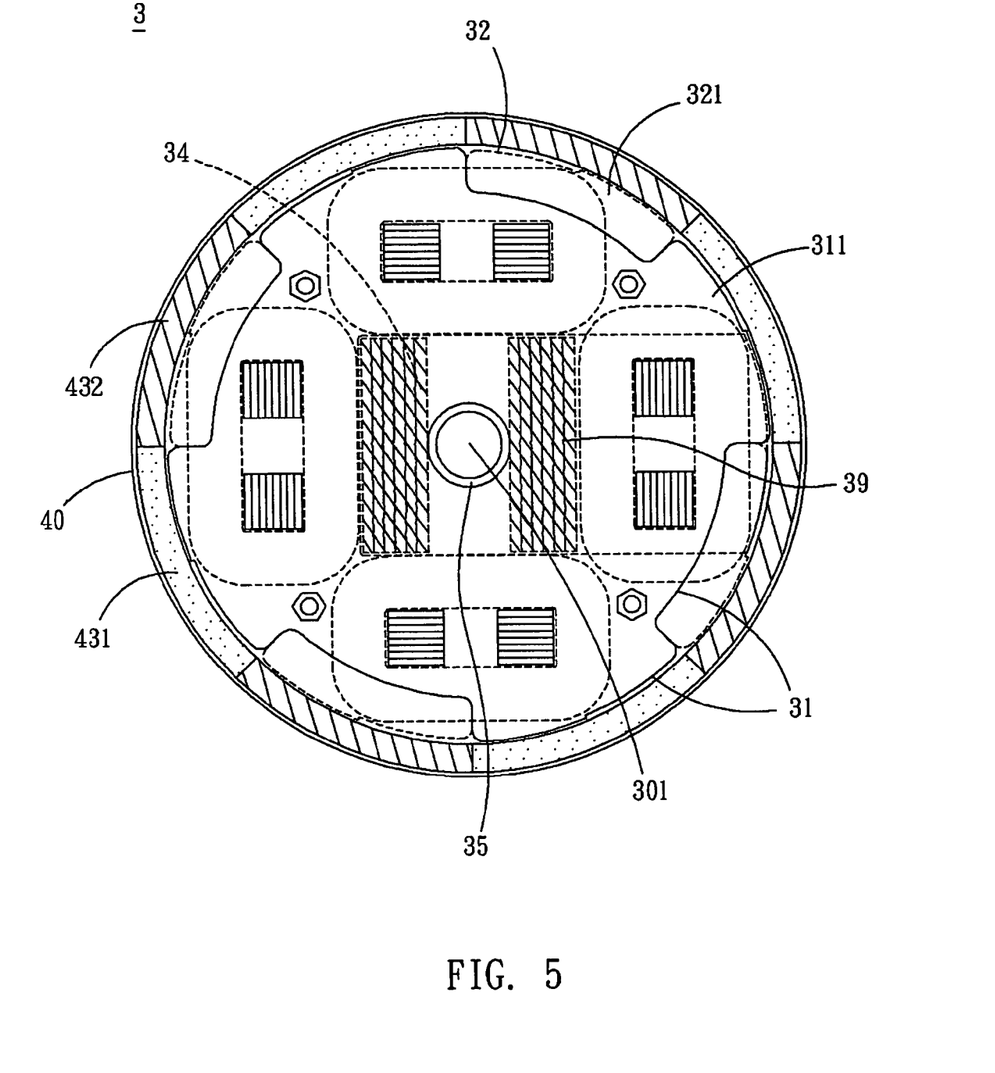
FIG. 5 is a top view showing a motor according to an embodiment of the present invention.

Referring to FIGS. 3 and 5, a motor 3 according to an embodiment of the present invention includes a stator structure 30, a rotor structure 40 and a driving circuit 34. The constructions, features, functions and arrangements of the stator structure 30 and the driving circuit 34 are the same as those disclosed hereinabove, so detailed descriptions thereof will be omitted.

The rotor structure 40 includes a shaft 41, a hub 42 and a magnet 43. The shaft 41 penetrates through the central axial holes 301 and is fitted into the bearing 38. The magnet 43 is annularly disposed on an inner wall of the hub 42 and has a plurality of first magnetic pole areas 431 and a plurality of second magnetic pole areas 432 (as shown in FIG. 5). The first protruding parts 311 and the second protruding parts 321 of the stator structure 30 are respectively corresponding to the first magnetic pole areas 431 and the second magnetic pole areas 432.

Figure 6:
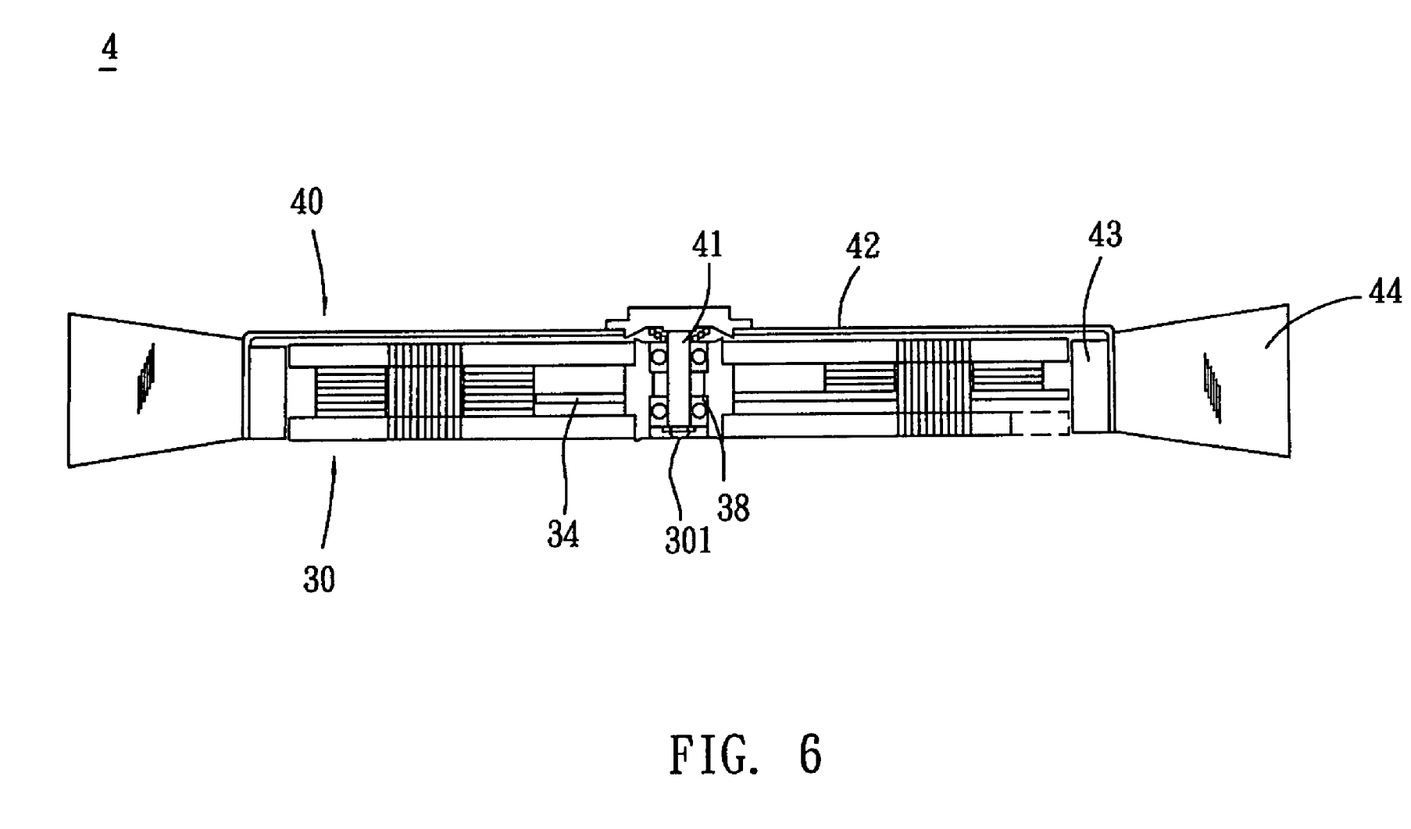
FIG. 6 is a cross-sectional view showing a fan according to an embodiment of the present invention.

Referring to FIG. 6, a fan 4 according to an embodiment of the present invention includes a stator structure 30, a rotor structure 40 and a driving circuit 34 The constructions, features, functions and arrangements of the stator structure 30 and the driving circuit 34 are the same as those disclosed hereinabove, so detailed descriptions thereof will be omitted.

The rotor structure 40 includes a shaft 41, a hub 42, a magnet 43 and a plurality of blades 44. The constructions, features, functions and arrangements of the shaft 41, the hub 42 and the magnet 43 are the same as those disclosed hereinabove, so detailed descriptions thereof will be omitted. The blades 44 are disposed on a circumference of an outer wall of the hub 42.

In order to make the present invention clearer, an example of the motor 3 will be described with reference to FIG. 7.

Figure 7:
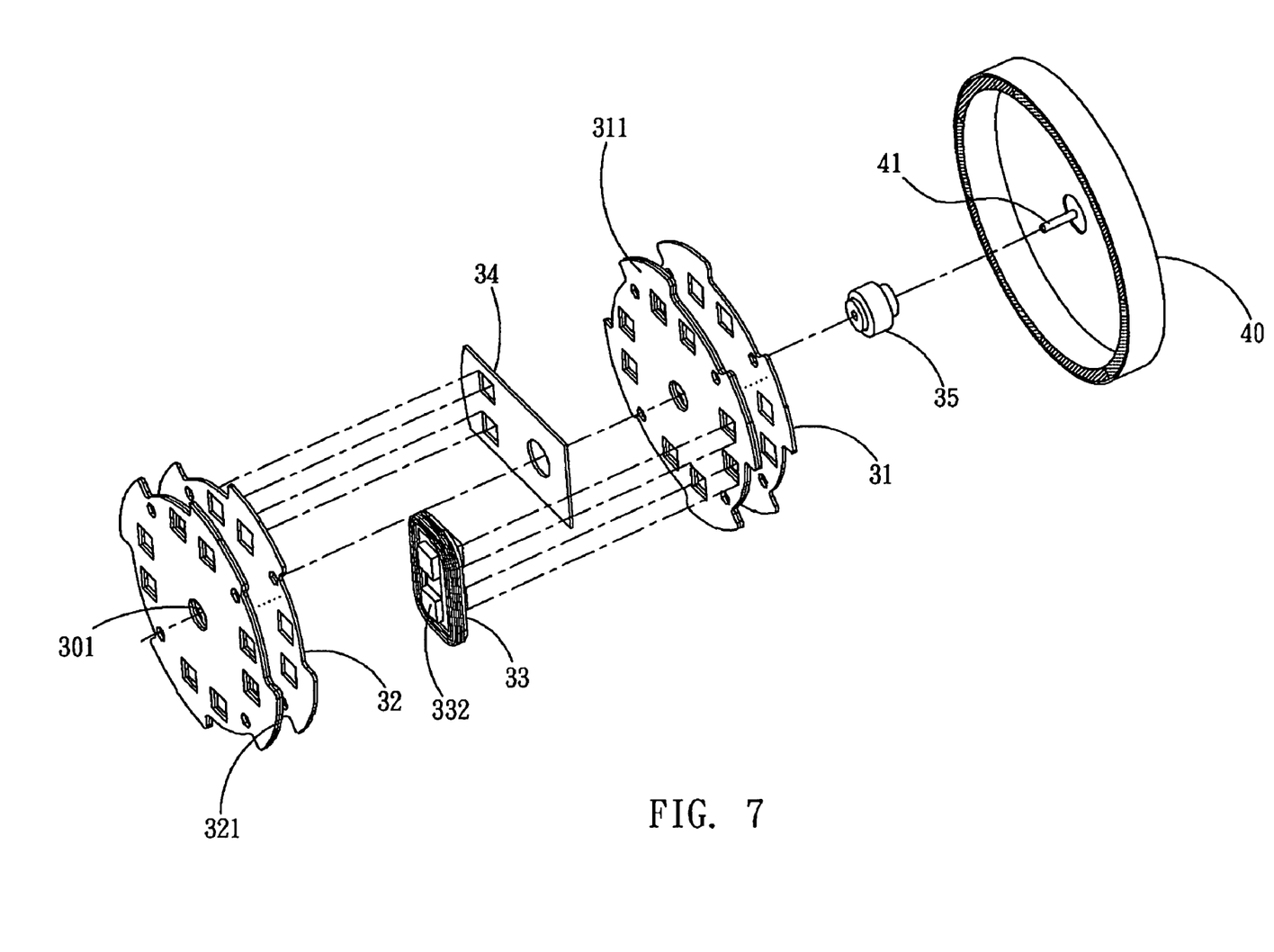
FIG. 7 is an exploded view showing a motor according to another embodiment of the present invention.

As shown in FIG. 7, the coil units 33 and the driving circuit 34 are disposed between the first magnetic substrate 31 and the second magnetic substrate 32. The coil units 33 are disposed at a location between the second magnetic substrate 32 and the driving circuit 34. The bearing sleeve 35 is fitted into the central axial holes 301 of the magnetic substrates 31 and 32, and the shaft 41 fixed to the rotor structure 40 is fitted into the bearing sleeve 35. In addition, the first magnetic substrate 31 is disposed between the second magnetic substrate 32 and the rotor structure 40.

The first protruding parts 311 of the first magnetic substrate 31 and the second protruding parts 321 of the second magnetic substrate 32 are alternately disposed. The first protruding parts 311 and the second protruding parts 321 are respectively corresponding to the first magnetic pole areas 431 and the second magnetic pole areas 432 of the rotor structure 40. When the driving circuit 34 controls the coil 331 to produce a current, the first magnetic substrate 31 has a first polarity and the second magnetic substrate 32 has a second polarity. Then, the driving circuit 34 controls the current direction of the coil 331 to generate an alternating magnetic field. Thus, the first magnet areas 431 or the second magnet areas 432 of the rotor structure 40 interact with the alternating magnetic field to produce a repulsive magnetic force, which enables the rotor structure 40 to rotate.

In summary, because the stator structure has a plurality of axial-winding coil units disposed between the first magnetic substrate and the second magnetic substrate, the axial-winding manner overcomes the conventional radial-winding problems of difficult winding process and the non-uniform magnetic field distribution. Comparing with the prior art, a fan, a motor and a stator structure thereof according to the present invention can simplify the manufacturing processes and enhance the magnetic effect. In addition, the loading supported by the center of the motor is reduced. Particularly, the first protruding parts of the first magnetic substrate and the second protruding parts of the second magnetic substrate are alternately arranged so when the driving circuit drives current to flow through the coils of the coil units, the first magnetic substrate and the second magnetic substrate will have different magnetic poles, and then the first protruding parts and the second protruding parts with different magnetic poles can interact with the first magnetic pole areas and the second magnetic pole areas of the magnet of the rotor structure in radial-induction manner to drive the rotor structure to rotate. The radial-induction manner also avoids the conventional axial-winding problem of deformation of the magnetic base.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A stator structure of a motor, comprising:
   a first magnetic substrate;
   a second magnetic substrate correspondingly disposed with respect to the first magnetic substrate; and
   at least one coil unit disposed between the first magnetic substrate and the second magnetic substrate, the coil unit comprising a coil wound around a central axis of the coil unit and at least one magnetically conductive element disposed within the coil.

2. The stator structure according to claim 1, wherein the first or the second magnetic substrate comprises a plurality of magnetic sheets.

3. The stator structure according to claim 1, wherein the first magnetic substrate and the second magnetic substrate are respectively provided with an axial hole, and the stator structure further comprising a bearing sleeve fitted into the axial holes of the first magnetic substrate and the second magnetic substrate.

4. The stator structure according to claim 3 further comprising a driving circuit which is disposed around the axial hole of the first magnetic substrate or the second magnetic substrate and coupled to the coil of the coil unit for controlling current directions of the coil and polarity changes of the first magnetic substrate and the second magnetic substrate.

5. The stator structure according to claim 1, wherein an outer profile of the first magnetic substrate has a plurality of first protruding parts, an outer profile of the second magnetic substrate has a plurality of second protruding parts, and the first and the second protruding parts are alternately arranged.

6. The stator structure according to claim 1, wherein the first magnetic substrate has a plurality of first through holes, the second magnetic substrate has a plurality of second through holes, and each of the magnetically conductive element penetrates through the first and second through holes.

7. The stator structure according to claim 1 further comprising at least one connecting element which has a thread on its inner wall and is embedded in the first magnetic substrate or the second magnetic substrate, wherein the first or the second magnetic substrate further comprises a through hole disposed corresponding to the connecting element.

8. The stator structure according to claim 1 further comprising at least one heat dissipating element disposed between the first magnetic substrate and the second magnetic substrate.

9. The stator structure according to claim 1 further comprising a first insulating layer disposed between the first magnetic substrate and the coil unit, and a second insulating layer disposed between the second magnetic substrate and the coil unit.

10. A motor, comprising:
    a stator structure comprising a first magnetic substrate, a second magnetic substrate and at least one coil unit, wherein an outer profile of the first magnetic substrate has a plurality of first protruding parts, an outer profile of the second magnetic substrate has a plurality of second protruding parts, the first magnetic substrate and the second magnetic substrate are oppositely disposed and respectively have an axial hole, the coil unit is disposed between the first magnetic substrate and the second magnetic substrate, and the coil unit has a coil wound around a central axis of the coil unit and at least one magnetically conductive element disposed within the coil;
    a rotor structure comprising a shaft, a hub and a magnet, wherein the shaft penetrates through the axial holes of the first and the second magnetic substrates, the magnet is annularly disposed in the hub and has a plurality of first magnetic pole areas and a plurality of second magnetic pole areas, and the first protruding parts and the second protruding parts are respectively corresponding to the first magnetic pole areas and the second magnetic pole areas; and a driving circuit coupled to the coil of the coil unit for controlling current directions of the coils.

11. The motor according to claim 10, wherein the first magnetic pole areas and the second magnetic pole areas are alternately arranged.

12. The motor according to claim 10, wherein the driving circuit is disposed around the axial hole of the first magnetic substrate or the second magnetic substrate for controlling polarity changes of the first magnetic substrate and the second magnetic substrate.

13. The motor according to claim 10, wherein the first magnetic substrate or the second magnetic substrate comprises a plurality of magnetic sheets.

14. The motor according to claim 10 further comprising: a bearing sleeve fitted into the axial holes of the first magnetic substrate and the second magnetic substrate, and at least one bearing accommodated in the bearing sleeve for supporting the shaft of the rotor structure.

15. The motor according to claim 10, wherein the first protruding parts and the second protruding parts are alternately disposed.

16. The motor according to claim 10, wherein the first magnetic substrate has a plurality of first through holes, the second magnetic substrate has a plurality of second though holes, and each of the magnetically conductive element penetrates through the first and the second through holes.

17. The motor according to claim 10 further comprising at least one connecting element which has a thread on its inner wall and is embedded in the first magnetic substrate or the second magnetic substrate, wherein the first or the second magnetic substrate further comprises a through hole disposed corresponding to the connecting element.

18. The motor according to claim 10 further comprising at least one heat dissipating element disposed between the first magnetic substrate and the second magnetic substrate.

19. The motor according to claim 10 further comprising a first insulating layer disposed between the first magnetic substrate and the coil unit, and a second insulating layer disposed between the second magnetic substrate and the coil unit.

20. A fan comprising:

a stator structure comprising a first magnetic substrate, a second magnetic substrate and at least one coil unit, wherein the first magnetic substrate and the second magnetic substrate are correspondingly disposed, the coil unit is disposed between the first magnetic substrate and the second magnetic substrate and has a coil wound around a central axis of the coil unit, and at least one magnetically conductive element is disposed within the coil;

a rotor structure comprising a shaft, a hub, a magnet and a plurality of blades, wherein the magnet is disposed in the hub, and the blades are disposed on a circumference of an outer wall of the hub; and a driving circuit coupled to the coil of the coil unit for controlling current directions of the coils.

* * * * *